United States Patent [19]

Guichard

[11] Patent Number: 4,584,597
[45] Date of Patent: Apr. 22, 1986

[54] METHOD FOR ENCODING A DIGITAL COLOR VIDEO SIGNAL BY RATE COMPRESSION

[76] Inventor: Jacques Guichard, 8-10, rue des Morillons, 75015 Paris, France

[21] Appl. No.: 597,066

[22] Filed: Apr. 4, 1984

[30] Foreign Application Priority Data

Apr. 13, 1983 [FR] France ................................ 83 06025

[51] Int. Cl.[4] ...................... H04N 11/04; H04N 11/06
[52] U.S. Cl. .......................................... 358/13; 358/12
[58] Field of Search ..................................... 358/13, 12

[56] References Cited

PUBLICATIONS

William K. Pratt, "Spatial Transform Coding of Color Images", *IEEE Transactions or Communications Technology*, vol. COM-19, No. 6, Dec. 1971, pp. 980–992.

*Primary Examiner*—James J. Groody
*Assistant Examiner*—Michael P. Dunnam
*Attorney, Agent, or Firm*—Lowe, King, Price & Becker

[57] ABSTRACT

A digital luminance signal and two digital color difference signals having high bit-rates and composed of words representing color picture elements are encoded into an encoded digital luminance signal and two encoded digital color difference signals having low bit-rates and composed of second words. The second words are selected in terms of real variation intervals of the two color differences having limits depending on a linear relation associating them with the luminance value.

10 Claims, 7 Drawing Figures

METHOD FOR ENCODING A DIGITAL COLOR VIDEO SIGNAL BY RATE COMPRESSION

BACKGROUND OF THE INVENTION

This invention relates to a method for encoding a digital color video signal by rate compression. More particularly, the encoding relates to a bit-rate compression of two digital color difference signals making up the video signal.

It is to be noted immediately that the invention does not deal with the coding methods based on differential pulse coded modulation (DPCM) that are currently used and that rely on intra-picture or inter-picture prediction.

OBJECT OF THE INVENTION

The main object of this invention is to derive slow bit-rate digital words representative of the picture elements to be transmitted and selected in terms of real variation intervals in color difference signals the limits of which depend on a linear relation associating them with a corresponding luminance signal.

SUMMARY OF THE INVENTION

Accordingly, there is provided a method for encoding a digital luminance signal and two digital color difference signals having high bit-rates and composed of first words representing color picture elements into an encoded digital luminance signal and two encoded digital color difference signals having low bit-rates and composed of second words. A predetermined peak-to-peak luminance amplitude is split into luminance regions that are each associated with two tables of second words of said two encoded signals respectively representative of predetermined variation sub-intervals in the two color differences for luminances lying within said luminance region. The first words of the two difference signals representing a picture element are encoded into two second words that are selected from the two respective tables associated with the luminance region including the luminance of said picture element and that are representative of two sub-intervals in the luminance region respectively including the two color differences of said picture element.

According to a first method, the number of bits in the second words included in the encoded color difference signals is constant and a quantification law peculiar to the encoding of the color difference signals is variable and differs from luminance region to luminance region.

According to a second method, a quantification law peculiar to the encoding of the color difference signals is constant and the number of bits in the second words is variable and differs from luminance region to luminance region.

According to a second embodiment of the methods, each luminance region is associated with a table of second words of one encoded color difference signal representing predetermined variation sub-regions in the two color differences for luminances lying within said luminance region. The first two words of the two color difference signals representing a picture element are encoded into a second word that is chosen from the respective table associated with the luminance region including the luminance of said picture element and that is representative of the sub-region in the luminance region including the two color differences of said picture element.

BRIEF DESCRIPTION OF THE DRAWING

Other objects and features of this invention will become apparent from the following more particular description of preferred embodiments of the invention as illustrated in the corresponding accompanying drawings in which.

DESCRIPTION OF THE PREFERRED EMBODIMENTS

Reference is made, hereinafter, to a composite color video signal made up of a luminance signal Y, a first color difference signal DR and a second color difference signal DB. The luminance signal has a standardized amplitude varying between 0 and 1. The value "0" corresponds to a black picture. The value "1" corresponds to a white picture. The amplitude of the luminance signal Y is given by the well know relationship:

$$Y = L_R R + L_G G + L_B B$$

R, G and B denote three primary coordinates of a color picture element in a conventional trichromatic Cartesian system and correspond to red, green and blue primary components respectively. $L_R$, $L_G$ and $L_B$ are luminance coefficients the sum of which is equal to unity. The approximate values of the luminance coefficients are respectively:

$$L_R = 0.3; L_G = 0.59; L_B = 0.11$$

The coordinates R, G and B are changed into the coordinates Y, DR and DB by way of the following equations:

$$Y = 0.3 R + 0.59 G + 0.11 B \qquad (1)$$

$$DR = R - Y$$

$$DB = B - Y$$

Reciprocally, the coordinates Y, DR and DB are changed into the coordinates R, G and B by way of the following equations:

$$R = Y + DR$$

$$G = Y - (0.3/0.59) DR - (0.11/0.59) DB$$

$$B = Y + DB.$$

For a black and white picture:

$$R = G = B = Y \text{ and } DR = DB = 0$$

In what follows, a third color difference signal also comes into play and is such that $DG=G-Y$.

It is assumed that the primary components R, G and B are provided under the form of digital signals and are derived by means of a sampling of primary analog components outputting from a color video source, such as a video camera. To simplify matters, it is presumed that a quantification is performed against a 100-level scale, from 0 to 100, although in practice such quantification takes place againist a 256-level scale, which corresponds to representing a sample by an 8-bit word. Since the primary components R, G and B vary between 0 and 100 and the luminance Y varies between 0 and 100, then three variation intervals for DR, DG and DB may be deduced as:

$$-70 \leq DR \leq 70$$

$$-41 \leq DG \leq 41$$

$$-89 \leq DB \leq 89$$

(2)

Figure 1:
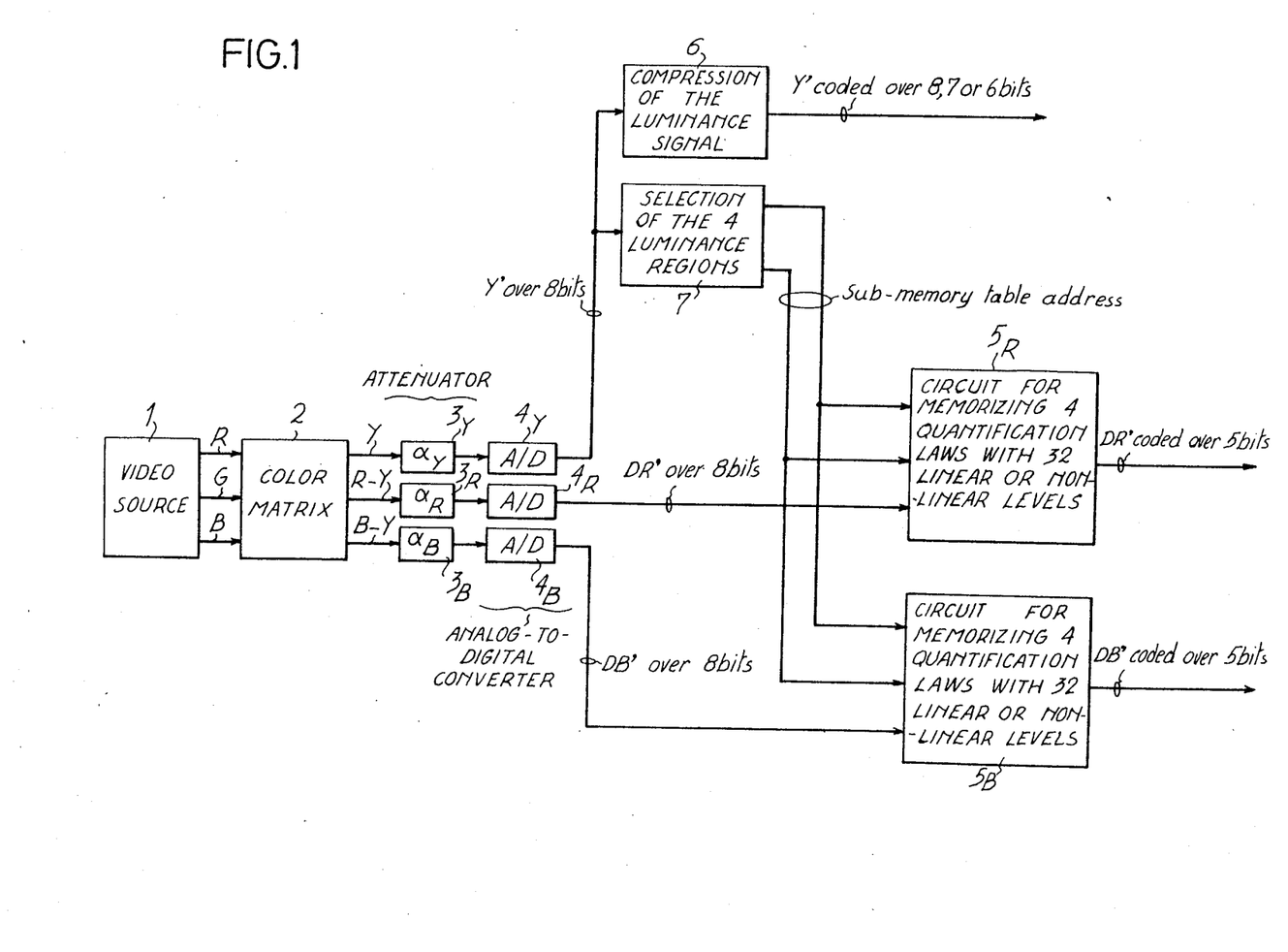
FIG. 1 is a schematic block diagram of an encoder according to a first embodiment of the first method.

However, in practice, the analog-to-digital conversion is preferably carried out by identical analog-to-digital converters on the three component signals, i.e. against the same sampling quantification scale. As depicted in FIG. 1, in an encoder, a color matrix 2 receives the analog signals R, G and B from a video source 1 and supplies the signals Y, $DR=R-Y$ and $DB=B-Y$ to inputs of analog attenuators $3_Y$, $3_R$ and $3_B$ respectively. Attenuation coefficients $\alpha_Y$, $\alpha_R$ and $\alpha_B$ relative to the attenuators $3_Y$, $3_R$ and $3_B$ are chosen such that the peak-to-peak amplitudes of analog signals Y', DR' and DB' outputting the attenuators are equal to the luminance signal amplitude. One finds for

| | |
|---|---|
| $0 \leq Y' = Y \leq 100$ | and $\alpha_Y = 1$, that |
| $DR' = (100/140\ DR)$, i.e. $\alpha_R = 0.71$ | and $-50 \leq DR' \leq 50$; |
| $DG' = (100/82)\ DG$, i.e. $\alpha_G = 1.22$ | and $-50 \leq DG' \leq 50$; |
| $DB' = (100/178)\ DB$, i.e. $\alpha_B = 0.56$ | and $-50 \leq DB' \leq 50$. |

The analog signals Y', DR' and DB' vary over intervals having a same width, and are then converted digitally into first 8-bit words by analog-to-digital converters $4_Y$, $4_R$ and $4_B$, respectively.

Figure 2:
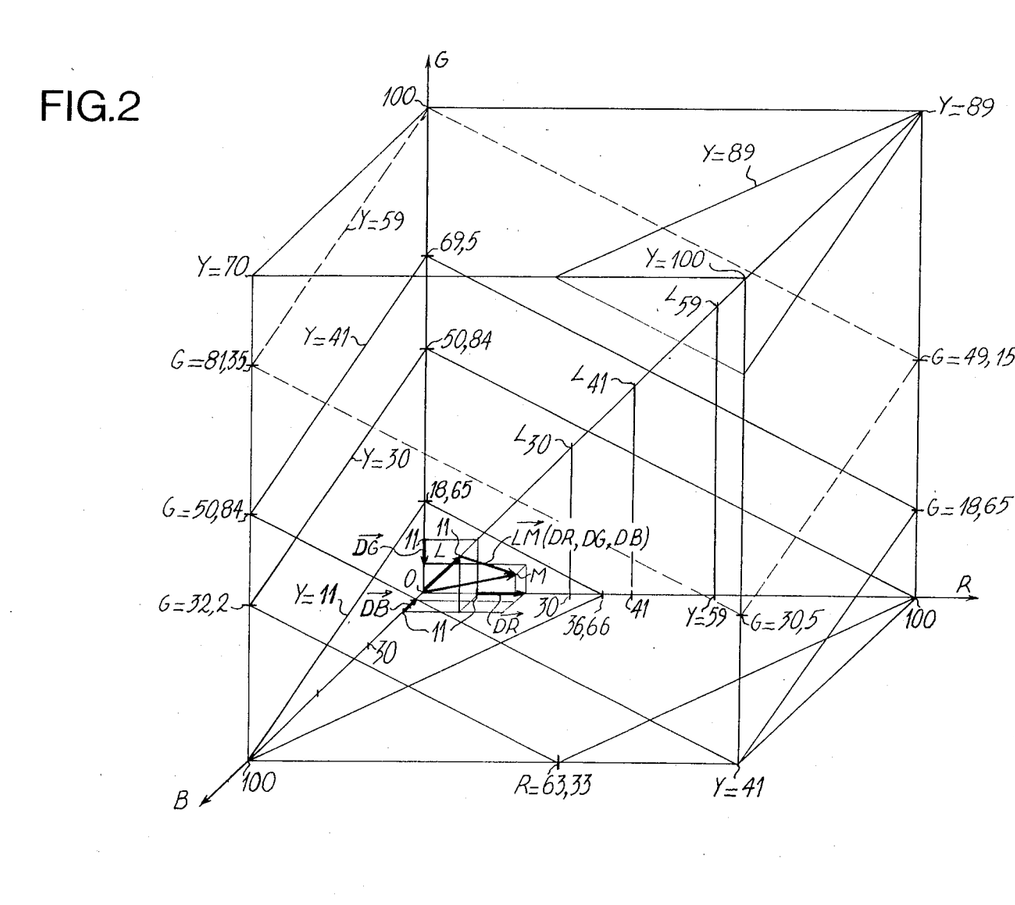
FIG. 2 depicts a trichromatic cubic domain of picture elements in the Cartesian reference frame with three primary coordinates R, G, B together with four constant luminance planes.

In the R, G and B trichromatic Cartesian reference frame depicted in FIG. 2, shown is a cube having an apex coinciding with a frame origin 0 and three faces coinciding with three major planes of the reference frame. The cube has edges having a length equal to 100 and set out the colometric boundaries of a picture element having coordinates R, G and B lying between 0 and 100. Four parallel planes defined by equation (1) for picture elements having constant respective luminances $Y=11$, $Y=30$, $Y=41$ and $Y=59$ are also shown in FIG. 2. Each of the four planes runs through one of apices of the cube. The plane $Y=11$ runs through an apex having coordinates $R=0$, $G=0$ and $B=100$ and corresponding to a picture element having a saturated blue color. The plane $Y=30$ runs through an apex having coordinates $R=100$, $G=0$ and $B=0$ and corresponding to a picture element having a saturated red color. The plane $Y=41$ runs through an apex having coordinates $R=100$, $G=0$ and $B=100$ and corresponding to a picture element having satured red and blue colors. The plane $Y=59$ runs through an apex having coordinates $R=0$, $G=100$ $B=0$ and corresponding to a picture element having a satured green color. Where the four parallel planes intersect the cube faces marks off then four quadrilateral areas within the cube. The coordinates of the apices of the quadrilateral areas, i.e. spot intersections of the four constant luminance planes with the cube edges, are also indicated in FIG. 2.

In FIG. 2, $L_{11}$, $L_{30}$, $L_{41}$ and $L_{59}$ designate points at the intersections of planes $Y=11$, $Y=30$, $Y=41$ and $Y=59$ and a cube diagonal running through the origin 0. The three primary coordinates R, G and B of the points $L_{11}$, $L_{30}$, $L_{41}$ and $L_{59}$ are equal to 11, 30, 41 and 59 respectively. In each plane Y, one can define a vector LM for any point M having coordinates R, G and B and contained in the plane Y. The coordinates of vector LM are the color differences: $DR=R-Y$, $DG=G-Y$ and $DB=B-Y$. By way of an example as shown in FIG. 2 in relation to plane $Y=11$, the variations in the vector LM aid to determine variation intervals of the color difference signals DR, DG and DB for $0 \leq Y \leq 11$ by considering the intervals according to the inequalities (2):

$$-11 = \sup\ (\inf\ (-11,0), -70) \leq DR \leq \inf\ (\sup\ ((36.6-11),0),70) = 25.6$$

$$-11 = \sup\ (\inf\ (-11,0), -41) \leq DG \leq \inf\ (\sup\ ((18.65-11),0),41) = 7.65$$

$$-11 = \sup\ (\inf\ (-11,0), -89) \leq DB \leq \inf\ (\sup\ ((100-11),0),89) = 89$$

where the operator "inf" means the small number and the operator "sup" means the large number.

Consequently, for all the picture elements having a luminance less than 11, the signals R, G and B do not take on all the values between 0 and 100 and the color difference signals DR and DB vary over intervals having widths smaller than the widths of the intervals defined by the inequalities (2). The restriction on the variation boundaries thus makes it possible to reduce the bit rate of information to be transmitted in terms of the luminance of the picture element.

According to a first coding method, the number of bits attributed to sample or picture element words of color difference signals DB and DR to be transmitted is constant and the linear or non-linear quantification law changes in terms of the luminance of the picture element to be transmitted. For instance, if four luminance regions are selected with boundaries defined by the three constant-luminance planes $Y=30$, $Y=41$ and $Y=59$, then in reference to FIG. 2, the following respective variation intervals for the color difference signals DR, DG and DB can be found and therefore the respective variation intervals of the color difference signals DR', DG' and DB' deduced by multiplication from the attenuation coefficients $\alpha_R$, $\alpha_G$ and $\alpha_B$.

for $0 \leq Y \leq 30$
$-30 = \sup\ (\inf\ (-30,0), -70) \leq DR \leq \inf$
$(\sup\ ((100-30),0),70) = 70$
$-30 = \sup\ (\inf\ (-30,0), -41) \leq DG \leq \inf$
$(\sup\ ((50.84-30),0),41) = 20.84$
$-30 = \sup\ (\inf\ (-30,0), -89) \leq DB \leq \inf$
$(\sup\ ((100-30),(100-11)),89) = 89$
i.e.:
$-22 \leq DR' \leq 50$
$-37 \leq DG' \leq 25$
$-17 \leq DB' \leq 50$
for $30 < Y \leq 41$
$-41 = \sup\ (\inf\ (-41, -30), -70) \leq DR < \inf$
$(\sup\ ((100-41),(100-30)),70) = 70$ -continued $-41 = \sup(\inf(-41,-30),-41) \leqq DG \leqq \inf$
$(\sup((69.5-41),(50.80-30)),41) = 28.5$
$-41 = \sup(\inf(-41,-30),-89) \leqq DB < \inf$
$(\sup((100-41),(100-30)),89) = 70$
i.e.:
$-30 \leqq DR' < 50$
$-50 \leqq DG' \leqq 35$
$-25 \leqq DB' < 40$
for $41 < Y \leqq 59$
$-59 = \sup(\inf(-59,-41),-70) \leqq DR < \inf$
$(\sup((100-59),(100-41)),70) = 59$
$-41 = \sup(\inf(-59,-41),-41) \leqq DG \leqq \inf$
$(\sup((100-59),(69.5-41)),41) = 41$
$-59 = \sup(\inf(-59,-41),-89) \leqq DB < \inf$
$(\sup((100-59),(100-41)),89) = 59$
i.e.:
$-43 \leqq DR' < 43$
$-50 \leqq DG' \leqq 50$
$-33 \leqq DB \leqq 33$
for $59 < Y \leqq 100$
$-70 = \sup(\inf(-59,-70),-70) < DR < \inf((100-59),70) = 41$
$-28.5 = \sup((30.5-59),-41) < DG < \inf((100-59),41) = 41$
$-89 = \sup(\inf(-89,-59),89) < DB < \inf((100-59),89) = 41$
i.e.:
$-50 < DR' < 30$
$-35 < DG' < 50$
$-50 < DB' < 23$ According to a first embodiment of the first method, each of the encoded color difference signals is transmitted by the encoder in the form of second 5-bit words, as shown in FIG. 1. The encoding operation is thus analogous to encoding the signal DR', DB' outputting the respective analog-to-digital converter $4_R$, $4_B$ over $2^5 = 32$ levels of one quantification law out of four chosen in terms of the luminance Y of the considered picture element. Each quantification law can be linear or non-linear and corresponds to one of the four luminance regions. The numbers of the 32 levels, or variation sub-intervals, under each of the four quantification laws take the form of 5-bit second words. Ascribed to each quantification law and therefore to each luminance region is a sub-memory memorizing a table of $2^8 = 256$ second words whereby each 8-bit first word DR', DB' corresponds to a second word representing the nearest level to the value of DR', DB'. Four sub-memories are included in a PROM or REPROM memory of a memorizing circuit $5_R$, $5_B$. Connected to an output of converter $4_Y$ is an input of a second memorizing circuit 6 and an input of a circuit 7 for selecting the four luminance regions. Circuit 6 contains a compression table for the luminance signal Y' whereby an outgoing 8, 7 or 6-bit word can be made to correspond to each incoming 8-bit word in accordance with the luminance compression law chosen. Depending on the 8-bit first word for the signal Y', circuit 7 determines the corresponding luminance region out of four with a view to addressing by means of a two-bit word supplied to each circuit $5_R$, $R_B$, one of the four sub-memories corresponding to the DR', DB' quantification law for the luminance region in question.

According to a second embodiment of the first method, a 10-bit second word is attributed to each pair of 8-bit first words DR' and DB' outputting converters $4_R$ and $4_B$. Indeed, the two variables DR' and DB', or DR and DB, are not unrelated.

Represented by shaded regions in FIGS. 3, 4, 5 and 6 are variation domains of color difference signals DB and DR for each of the four luminance regions. The variation domains are obtained by plotting straight lines from equation $DB = -2.73\ DR - 5.36\ DG$ for DG equal to constants lying between the respective boundaries.

The latter equation is derived from equation (1) as follows:

$$Y = 0.38\ R + 0.59\ G + 0.11\ B$$

or $$0 = 0.3(R-Y) + 0.59(G-Y) + 0.11(B-Y)$$

or $$DB = -(0.3/0.11)DR - (0.59/0.11)DG.$$

Figure 3:
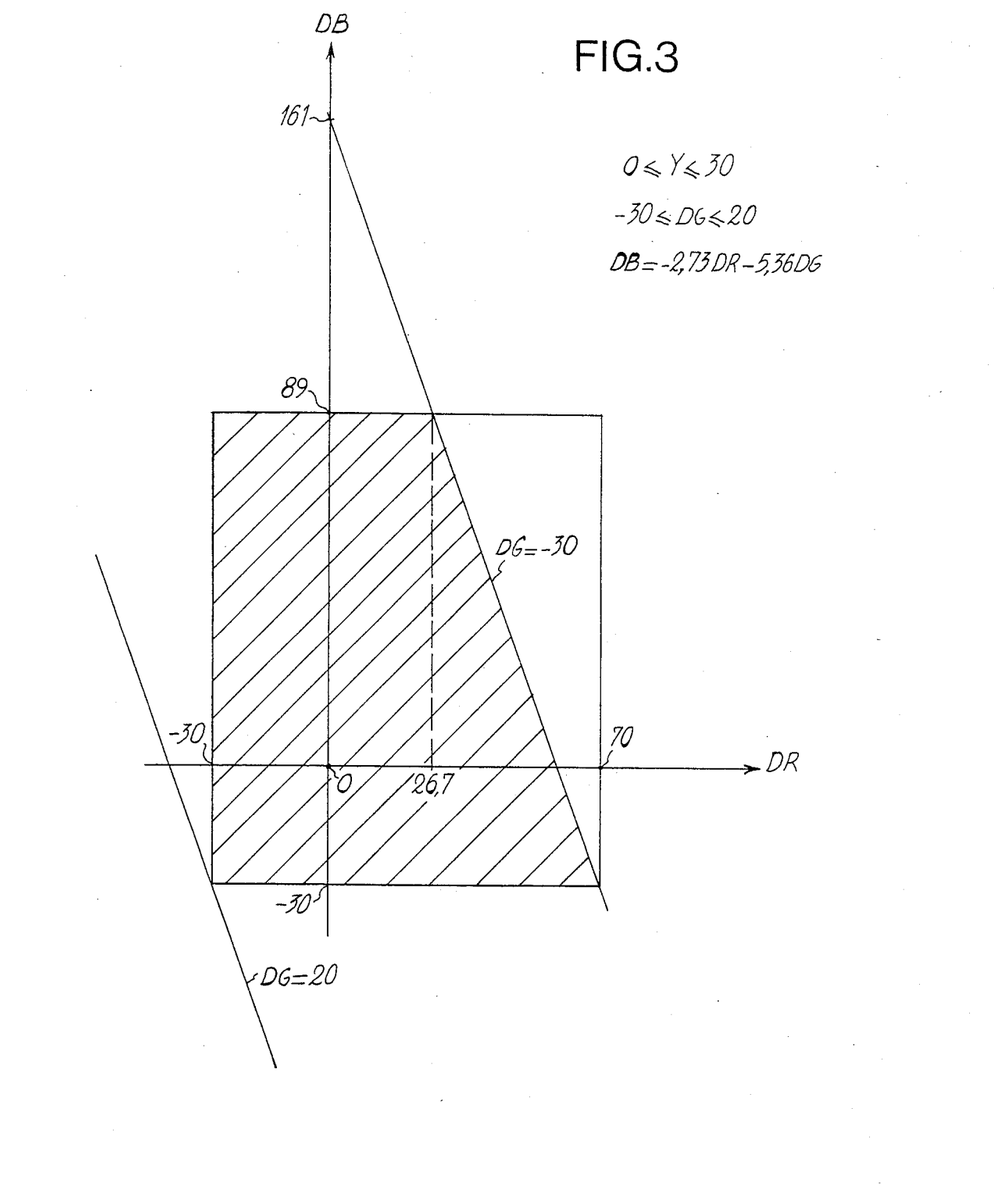
FIGS. 3 to 6 depict variation regions of two color difference signals DR and DB for four luminance regions according to a second embodiment of the first method, respectively.
Figure 4:
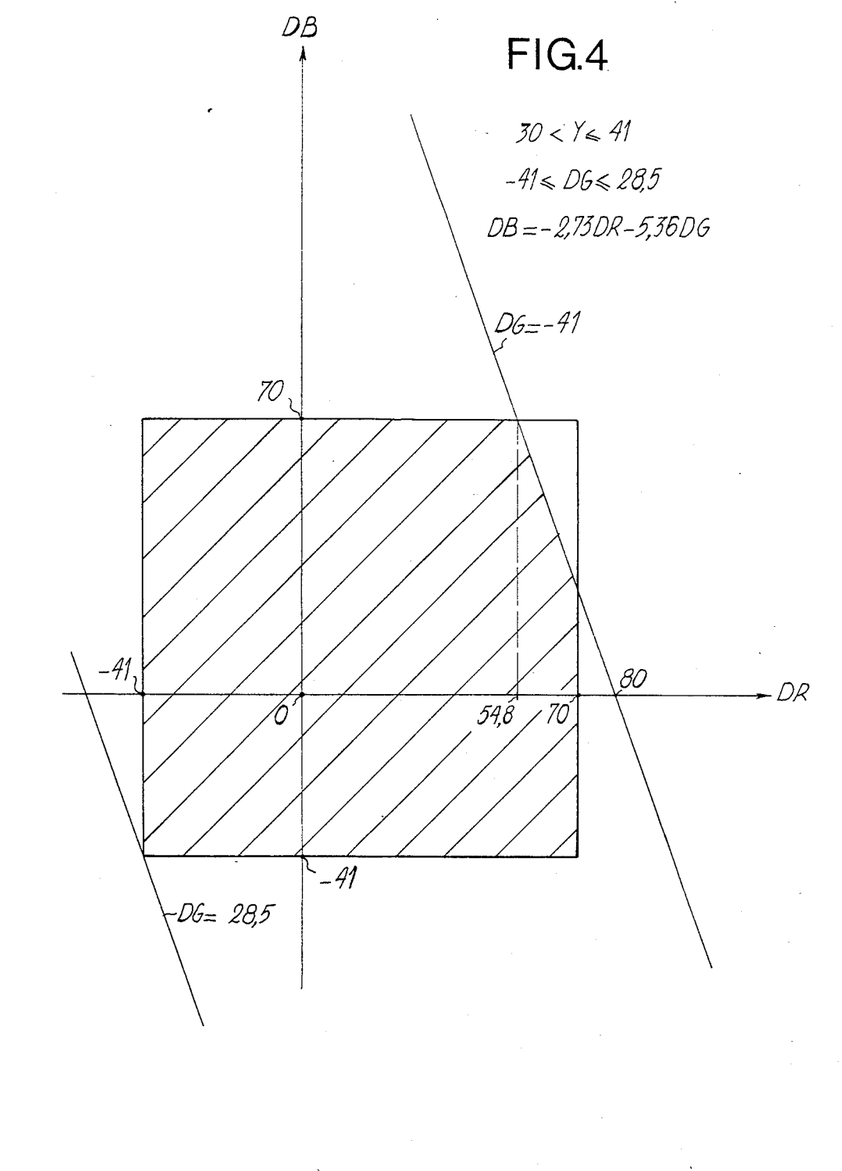
Figure 5:
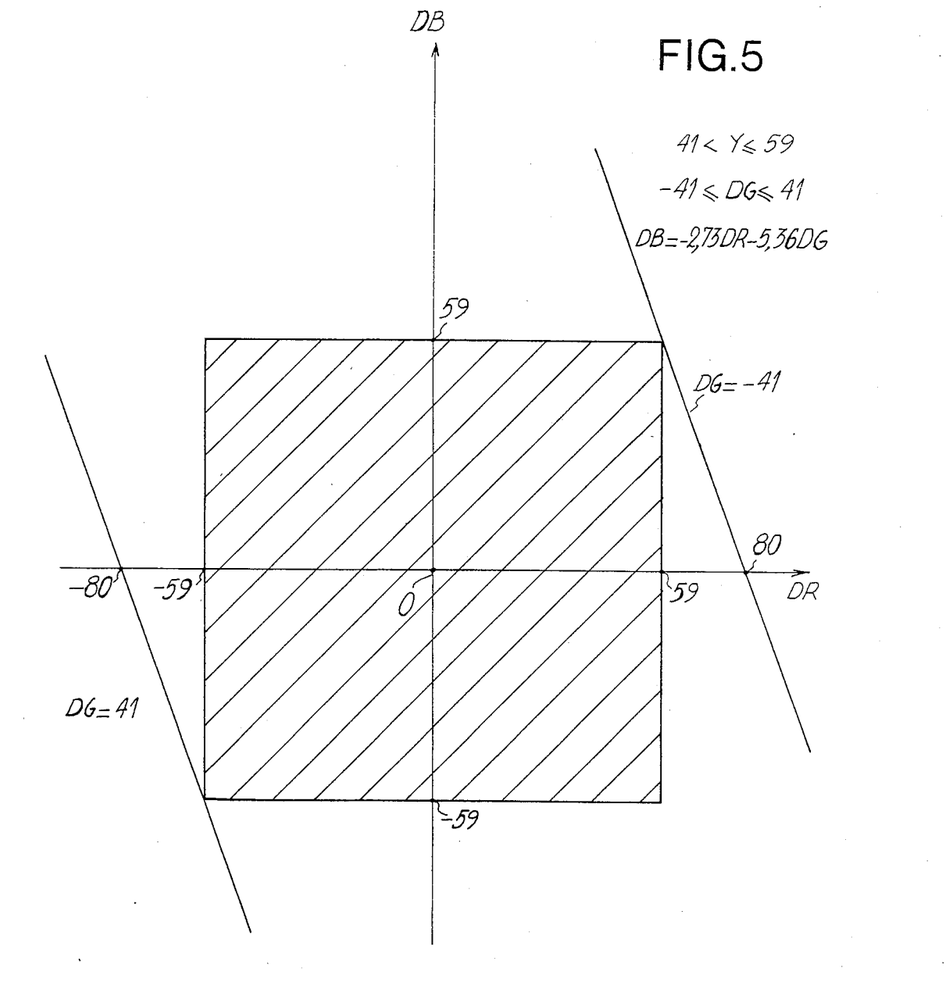
Figure 6:
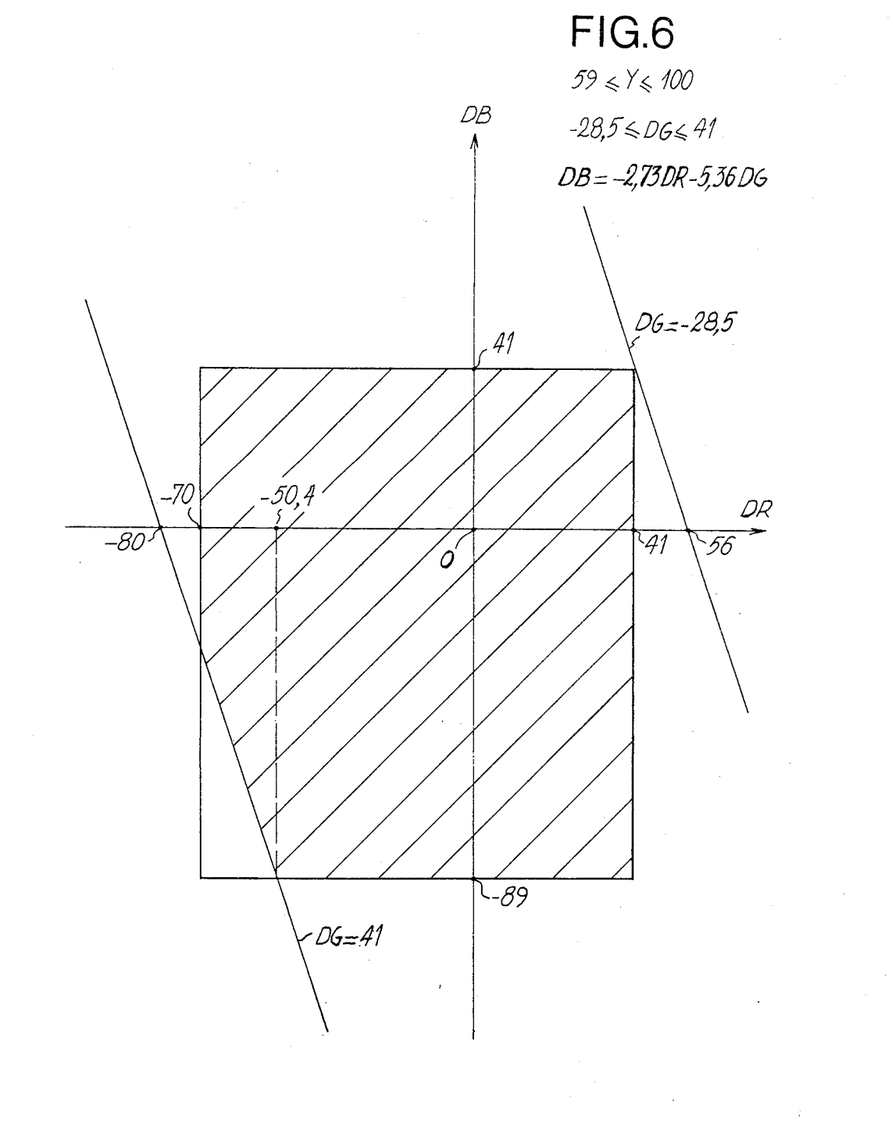

For the first, second and fourth luminance regions, as shown in FIGS. 3, 4 and 6, it is to be observed that the variables DB and DR are not totally independent.

Instead of quantifying the full width of the variation intervals for the signals DR and DB as in the first embodiment, only the shaded regions in FIGS. 3 to 6 are quantified in $2^{10} = 1024$ sub-regions indexed by numbers in the form of 10- bit words.

Figure 7:
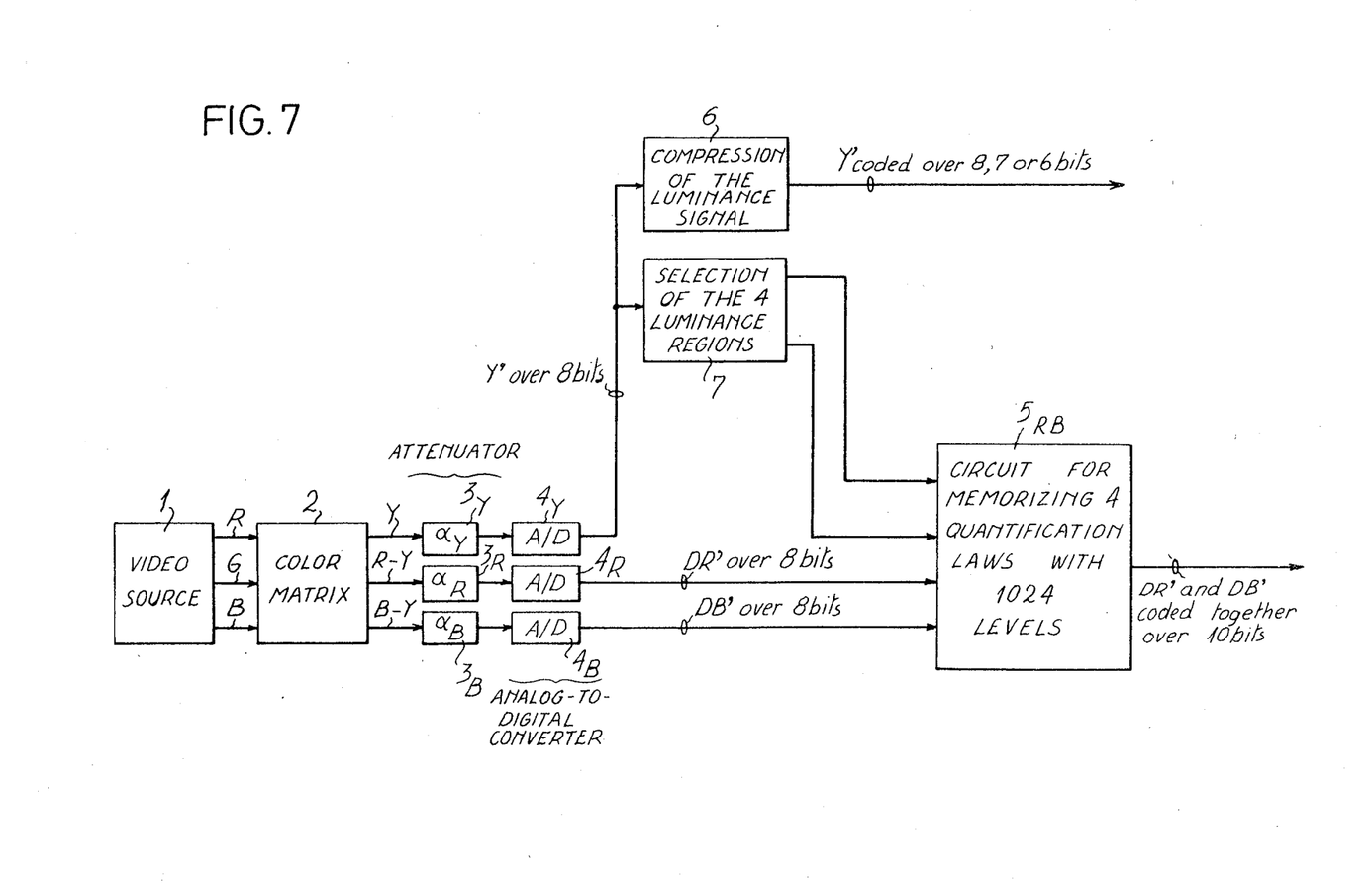
FIG. 7 is a schematic block diagram of an encoder according to a second embodiment of the first method.

An encoder according to the second embodiment depicted in FIG. 7 is analogous to the encoder shown in FIG. 1, except that both memorizing circuits $5_R$ and $5_B$ are replaced by a single memorizing circuit $5_{RB}$. Circuit $5_{RB}$ contains four PROM and REPROM sub-memories each ascribed to a luminance region and each carrying $2^8 \times 2^8$ 10-bit words each chosen from the 1024 words representing the numbers of the sub-regions in the luminance region. A same 10-bit word corresponds to all the picture elements Y', DR', DB' belonging to a same sub-region. The 1024 different words of a sub-memory correspond to 1024 colors or sub-regions in the corresponding shaded region of FIGS. 3 to 6. In other words, to each pair of two 8-bit incoming words DR' and DB' representing a picture element having a composite color lying within a shaded sub-region is attributed a color out of 1024 coded in an outgoing 10-bit word. According to the second embodiment of the first method, a greater number of elements is therefore available for transmitting the same information compared to the first embodiment which amounted to selecting 1024 elements in the rectangular regions of FIGS. 3 to 6 determined by the limits of variables DB and DR. The transmission quality is thus enhanced.

In accordance with a second encoding method, in each luminance region, the number of bits ascribed to the sample or picture element words of color difference signals DR and DB (or DR' and DB') to be transmitted is variable in terms of the picture element luminance, and the linear or non-linear quantification law is constant and independent of the luminance region extents. An encoder carrying out the second method is organized in an analogous fashion to the encoder in FIG. 1. The memorizing circuits ascribed to the signals DR' and DB' also each comprise four sub-memories corresponding to the four luminance regions. By way of an example, when the width of the variation intervals for the signals DR and DB is small, e.g. less than 70, signals DR' and DB' are encoded into 4-bit outgoing words, and when the width of the variation intervals for signals DR and DB is big and exceeds 70, DR' and DB' are encoded into 5-bit outgoing words. The outgoing signals carry a variable bit-rate and are transmitted in packets if the transmission network is of the variable bit-rate and the packetized type, or otherwise are transmitted via a buffer memory matching the variable bit-rate to a constant bit-rate of the network.

Although the invention has been described with reference to digital signals Y, DR and DB, or Y', DR' and DB', having first words carrying a same number of bits, the method embodying the invention is also appropriate to any array of digital signals obtained from a composite video signal and carrying words having differing bit numbers. Indeed, as the proportion of the blue color in the luminance signal is lower than the proportion of the red color, the DB signal words can have less bits than the DR signal words, e.g. six and eight bits respectively.

Furthermore, the method embodying the invention can be applied to any other combination of signals Y, DR and DB differing from the abovementioned combination in relation to the SECAM standard. An other combination relates to the NTSC standard and is made up of the luminance signal Y and chrominance signals $E_Q$ and $E_I$ given by the following equations:

$$E_Q = 0.48 \, DR + 0.41 \, DB$$

$$E_I = 0.74 \, DR - 0.27 \, DB.$$

New luminance regions and hence new variation intervals and variation regions for the color difference signals, otherwise called as chrominance signals, are then defined within the trichromatic reference frame.

What I claim is:

1. A method for encoding a digital luminance signal and two digital color difference signals having high bit-rates and composed of first words representing color picture elements into an encoded digital luminance signal and two encoded digital color difference signals having low bit-rates and composed of second words, wherein a predetermined peak-to-peak luminance amplitude is split into luminance regions that are each associated with two tables of second words of said two encoded signals respectively representative of predetermined variation sub-intervals in the two color differences for luminances lying within one of said luminance regions, and wherein said first words of said two color difference signals representing a picture element are encoded into two second words that are selected from the two respective tables associated with the luminance region including the luminance of said picture element and that are representative of two sub-intervals in the luminance region respectively including the two color differences of said picture element.

2. The method claimed in claim 1 wherein the number of bits in said second words is constant, and said second words in each table are representative of variation sub-intervals chosen in accordance with a quantification law of the full variation interval of the respective color difference signal for the associated luminance region.

3. The method claimed in claim 2 wherein the limits of said variation intervals in said two color difference signals are interdependent on variation limits of a third color difference signal for the associated luminance region.

4. The method claimed in claim 1 wherein said second words for each color difference represent sub-intervals in a constant quantification law for the associated color difference signal, and the number of bits in said second words of each table is dependent on the width of the variation interval of the color difference signal for the associated luminance region.

5. The method claimed in claim 1 wherein prior to encoding, two analog color difference signals are corrected into two corrected color difference signals having peak-to-peak amplitudes equal to said peak-to-peak amplitude of an analog luminance signal, and said analog luminance signal and said corrected luminance signals are converted into said digital luminance signal and said two digital color difference signals in accordance with a same sampling quantification scale.

6. A method for encoding a digital luminance signal and two digital color difference signals having high bit-rates and composed of first words representing color picture elements into an encoded digital luminance signal and an encoded digital color difference signal having low bit-rates and composed of second words, wherein a predetermined peak-to-peak luminance amplitude is split into luminance regions that are each associated with a table of second words of said encoded color difference signal representative of predetermined variation sub-regions in the two color differences for luminances lying within one of said luminance regions, and wherein two of said first words of said two color difference signals representing a picture element are encoded into a second word that is selected from the respective table associated with the luminance region including the luminance of said picture element and that is representative of the sub-region in said luminance region including the two color differences of said picture element.

7. The method claimed in claim 6 wherein the number of bits in said second words is constant, and said second words in each table are representative of variation sub-regions chosen in accordance with a quantification law of the full variation region of the two color difference signals for the associated luminance region.

8. The method claimed in claim 7 wherein the limits of said variation regions in said two color difference signals are dependent on variation limits of a third color difference signal for the associated luminance region.

9. The method claimed in claim 6 wherein said second words of said two color differences represent sub-regions in a constant quantification law for said two color difference signals, and the number of bits in said second words of each table is dependent on the extent of the variation region of said two color difference signals for the associated luminance region.

10. The method claimed in claim 6 wherein prior to encoding, two analog color difference signals are corrected into two corrected color difference signals having peak-to-peak amplitude equal to said peak-to-peak amplitude of an analog luminance signal, and said analog luminance signal and said two corrected color difference signals are converted into said digital luminance signal and said two digital color difference signals in accordance with a same sampling quantification scale.

* * * * *